United States Patent [19]
Choi

[11] Patent Number: 5,672,188
[45] Date of Patent: Sep. 30, 1997

[54] HIGH CAPACITY FILTER MEDIA

[75] Inventor: Kyung-Ju Choi, Jefferson, Ky.

[73] Assignee: AAF International, Louisville, Ky.

[21] Appl. No.: 653,789

[22] Filed: May 28, 1996

[51] Int. Cl.$^6$ .............................. B01D 39/16; B01D 46/12
[52] U.S. Cl. .................... 55/485; 55/486; 55/488; 55/497; 55/528
[58] Field of Search .................. 55/485–488, 497, 55/501, 521, 524, 527, 528

[56] References Cited

U.S. PATENT DOCUMENTS

| | | | |
|---|---|---|---|
| 2,835,341 | 5/1958 | Parker, Jr. ........................ | 55/487 X |
| 2,888,095 | 5/1959 | Perrini et al. .................... | 55/487 |
| 3,144,315 | 8/1964 | Hunn ............................... | 55/486 X |
| 3,201,926 | 8/1965 | Harrington ........................ | 55/486 |
| 3,258,900 | 7/1966 | Harms ............................. | 55/487 X |
| 3,400,520 | 9/1968 | Sakurai ........................... | 55/487 |
| 3,505,794 | 4/1970 | Nutter et al. .................... | 55/487 |
| 3,710,948 | 1/1973 | Sexton et al. ................... | 210/484 |
| 4,093,437 | 6/1978 | Ichihara .......................... | 55/487 |
| 4,188,197 | 2/1980 | Amberkar et al. ................. | 55/487 X |
| 4,702,940 | 10/1987 | Nakayama et al. ............... | 55/487 X |
| 4,728,349 | 3/1988 | Oshitari .......................... | 55/487 |
| 4,886,527 | 12/1989 | Föttinger et al. ................ | 55/156 |
| 4,917,942 | 4/1990 | Winters .......................... | 55/486 X |
| 4,938,786 | 7/1990 | Tonomoto ........................ | 55/487 X |
| 4,983,193 | 1/1991 | Tani et al. ....................... | 55/487 |
| 5,108,474 | 4/1992 | Riedy et al. ..................... | 55/486 X |
| 5,240,479 | 8/1993 | Bachinski ........................ | 55/487 X |
| 5,244,482 | 9/1993 | Hassenboehler, Jr. et al. .... | 55/528 |
| 5,283,106 | 2/1994 | Seiler et al. ..................... | 55/528 X |
| 5,427,597 | 6/1995 | Osendorf ......................... | 55/487 |
| 5,496,627 | 3/1996 | Bagrodia et al. ................. | 428/284 |

FOREIGN PATENT DOCUMENTS 2036591  7/1980  United Kingdom.

OTHER PUBLICATIONS

"Effect of Process Variable on Flow And Pore Properties of Melt Blown Web"—Fluid/Particle Separation Journal vol. 7, No. 4, pp. 151–154 Dec. 1994 Choi, K.J.
"Prediction of Air Permeability etc . . ."—Inj. vol. 6, No. 3 pp. 62–63, Choi, K.J.
"Pore Distribution etc . . ."—Fluid/Particle Separation Journal vol. 7, No. 1, pp. 1–3, Mar. 1994 Choi, K.J.
"Permeability–Pore Size Relationship etc. —1995 Non–Wovens" Cont pp. 49–50 Choi, K.J.

*Primary Examiner*—Robert Spitzer
*Attorney, Agent, or Firm*—Polster, Lieder, Woodruff & Lucchesi

[57] ABSTRACT

A fluid filter arrangement including layered filter media capable of successively filtering varying sized particulate matter from a treated fluid stream with each layer of the layered filter media having a substantially equal terminal pressure drop thereacross.

19 Claims, 1 Drawing Sheet

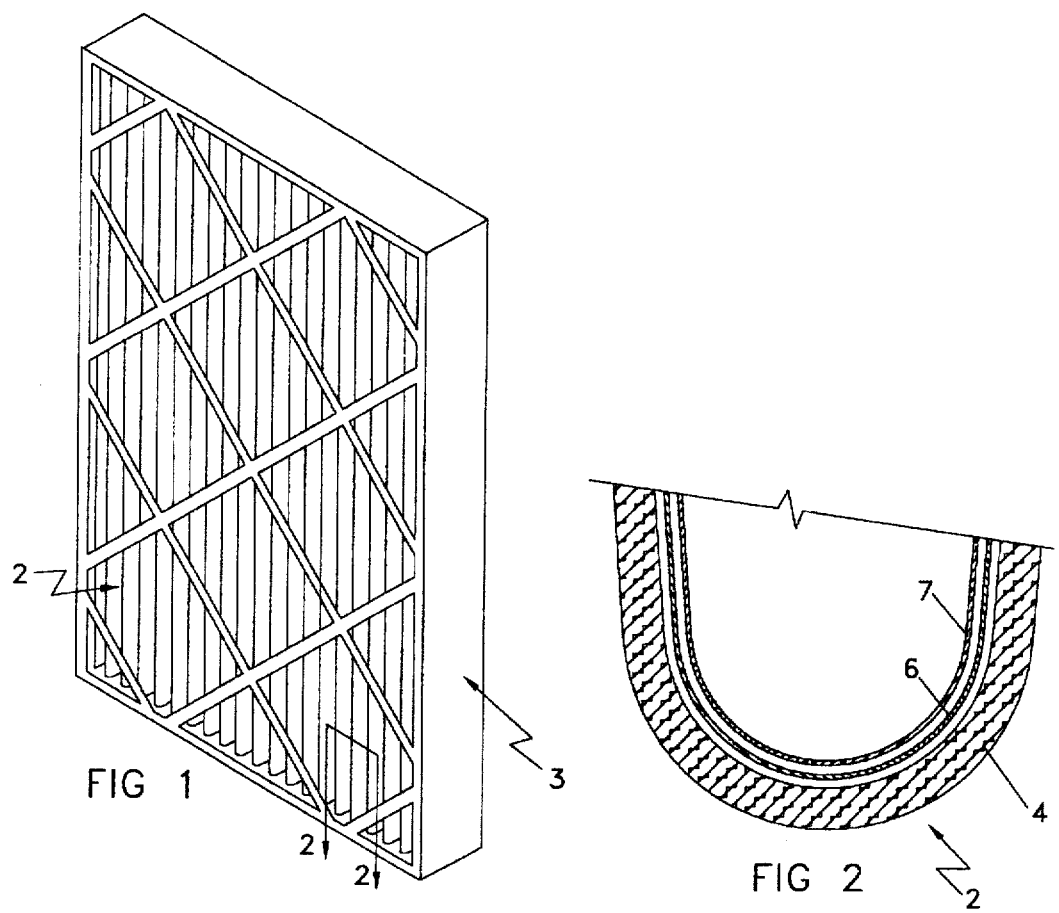
FIG 1
FIG 2
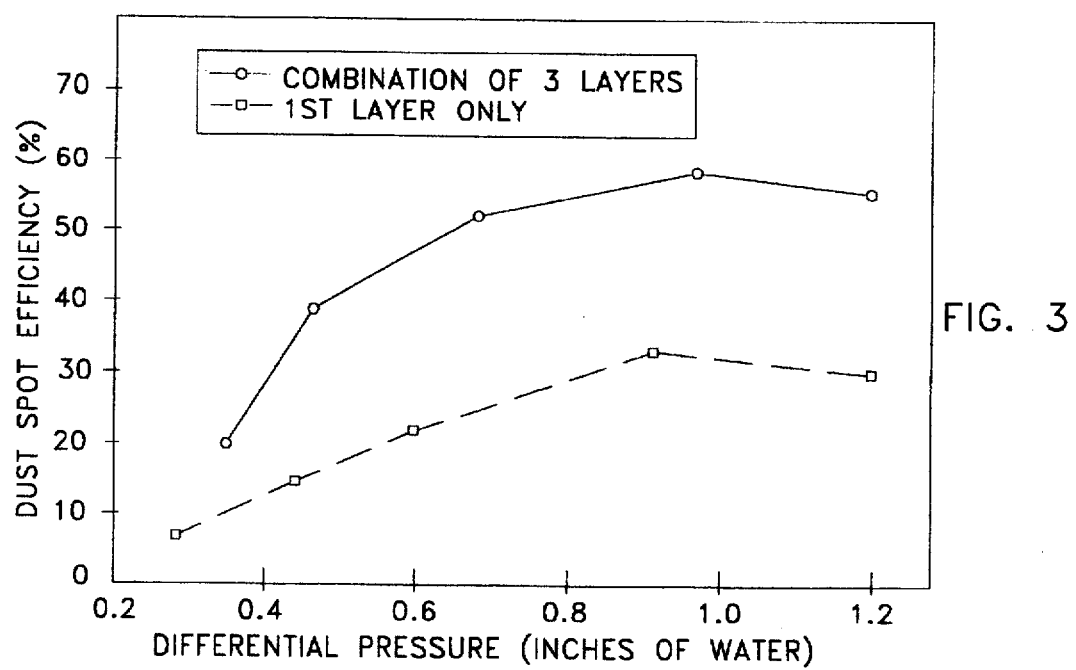
FIG. 3

5,672,188

HIGH CAPACITY FILTER MEDIA

BACKGROUND OF THE INVENTION

The present invention relates to filter media for separating contaminant particles from a fluid stream and more particularly to selectively layered fibrous air filter media capable of successively filtering varying sized particles from a fluid stream to be treated with each layer having a substantially equal terminal pressure drop thereacross.

Layered filtering media with the layers being of varying sized fibers and varying thickness are generally well known in the fluid filtering arts. In this regard, attention is directed to a number of such patents, each of which teaches a form of multi-layered filter media: namely, U.S. Pat. Nos. 3,201,926, issued to R. G. Harrington on Aug. 24, 1965; No. 3,710,948, issued to R. W. Sexton on Jan. 16, 1973; No. 4,093,437, issued to H. Ichihara on Jun. 6, 1978; No. 4,886,527, issued to W. Fattinger et al on Dec. 12, 1989; No. 5,427,597, issued to R. Osendorf on Jun. 27, 1995; No. 5,496,627, issued to S. Bagrodia on Mar. 5, 1996; and, to U.K. patent No. 2,036,591A published on Jul. 2, 1980. It also is known in the art to utilize multi-layered non-woven filter medium and melt blown web media, attention being directed to four articles describing experimental research conducted by and published by Kyung-Ju Choi during the years 1994–95, one of which is entitled "Effect of Process Variable on Flow and Pore Properties of Melt Blown Web", Vol. 7, No. 4, December 1994, Fluid/Particle Separation Journal, pp. 151–154; Technical Note, entitled "Prediction of Air Permeability and Pore Distribution of Multi-Layered Nonwovens", International Nonwovens Journal, Vol. 6, No. 3, pp. 62–63; "Pore Distributions and Permeability of Cellulosic Filtration Media," Fluid/Particle Separation Journal, Vol. 7, No. 1, March 1994; and, finally pp. 49–50 of an article published in 1995 at the Nonwovens Conference, TAPPI Proceedings discusses certain physical properties of filter media including sintered metal, cellulose, microglass and synthetic polymeric media. This article is entitled, "Permeability—Pore Size Relationship of Nonwoven Filter Media," with the article noting differences between cellulose and microglass media.

The present invention, acknowledging that the broad use of multi-layered filter media is old in the filter art and recognizing from experimental research the known possible filtering potential of certain types of filter media—as well as the possible individual filtering capabilities—provides a new, useful and unique combination of filter media assembled in preselected layered form in a filter media arrangement heretofore unknown in the fluid filtration art. In accordance with the present invention a substantially optimum particle capture capacity utilization of each uniquely preselected layer of filter media is obtained with the terminal pressure drop across each layer being substantially equal. The unique layered filter medium of the present invention is economical and straightforward in manufacture and assembly, providing a highly efficient comparatively low resistance filter media assembly which can be employed in various geometric configurations for industrial, commercial, and domestic use. The uniquely assembled filter media of the present invention not only offers increased dust holding capacity, but with the utilization of comparatively fine fibers and preselected binders the layered filter media of the present invention obtains desired pore distribution characteristics, added bulk, and increased strength.

Various other features of the present invention will become obvious to one skilled in the art upon reading the disclosure therein.

BRIEF SUMMARY OF THE INVENTION

More particularly, the present invention provides a composite filter arrangement of fibrous layers of filter media for removing particulate matter from a fluid stream comprising: an upstream first layer of a mixture of preselected fiber filter media components, the first layer being of preselected thickness with the fiber components being of preselected diameter to provide a first preselected fluid permeability; and at least a second successive layer of polymeric fibers of filter media of preselected thickness and fiber diameter to provide a second preselected fluid permeability, each of the layers having a substantially equal terminal pressure drop thereacross. The present invention further provides a third layer of filter media of preselected thickness and fiber diameter less than the fiber diameter of the second successive layer to provide a third preselected fluid permeability, each of the three layers having a substantially equal terminal pressure drop thereacross. The present invention also provides a unique binder applied to opposite faces of the first layer of filter media to maintain a preselected stiffness and porosity.

It is to be understood that various changes can be made in one or more of the several components disclosed herein by one skilled in the filter art without departing from the scope or spirit of the present invention. For example, although three preselected layers of filter media are advantageously set forth herein, it would be possible to include other layers preselectively chosen in accordance with the inventive concepts as described herein.

BRIEF DESCRIPTION OF THE DRAWINGS

Referring to the drawings which disclose one advantageous embodiment of the invention:

FIG. 1 is an isometric view of a pleated unit filter structure incorporating the filter media of the present invention.

FIG. 2 is an enlarged, cross-sectional slightly exploded view taken in plane through line 2—2 of FIG. 1, disclosing a portion of the layered, facing filter media and the relative thicknesses; and, FIG. 3 is a graph showing the increased dust spot efficiency of three layers of the inventive filter media as compared to a single layer of filter media.

DETAILED DESCRIPTION OF THE INVENTION

As can be seen particularly in FIGS. 1 and 2 of the drawings, the novel composite layered filter media 2 is shown as a media pack bonded in pleated form in a double wall, die cut box frame 3 which can be of a suitable cardboard material. It of course is to be understood that the present inventive filter media 2 is not limited to the particular frame and pleated form use as shown but that it can be used in other geometric configurations and forms identifiable with other commercial, industrial and domestic markets.

As can be seen particularly in the enlarged FIG. 2 of the drawings, the composite filter arrangement 2 of fibrous layers of filter media for removing particulate matter from a fluid stream, here is disclosed as including three fibrous filter layers 4,6 and 7. The upstream first layer 4 advantageously is comprised of an air laid mixture of cotton and polyester fiber filter media with the cotton fibers having diameters in the approximate range of ten to twenty eight micrometers (10–28 um) and with the polyester fibers having diameters in the approximate range of five to sixteen micrometers (5–16 um). Upstream layer 4 has an approximate thickness of zero point one two five inches (0.125") and an approximate basis weight of two point five ounces per square yard (2.5 oz./sq.yd.). Further, upstream layer 4 has an approximate air permeability of five hundred cubic feet per minute per square foot (500 CFM/sq.ft.) with a binder advantageously of ethylene vinyl chloride (EVC) or poly vinyl acetate (PVAC) or binder fiber applied to opposite faces thereof so as to enhance porosity of fibrous layer 4 and to give the layer further bulk and thickness.

The second fibrous layer 6, which like layer 7 (described hereinafter) is shown in exploded position as an intermediate layer and is, in fact, advantageously in facing relation with layers 4 and 7. Second layer 6 advantageously is of melt blown polymeric fibers, these polymeric fibers having been extruded through a die plate with a row of small spaced holes. These molten fibers are attenuated by high velocity hot air. The second intermediate fibrous layer 6 has an approximate thickness of zero point zero zero six inches (0.006") with an approximate basis weight of zero point three two ounces per square yard (0.32 oz/sq.yd.). The fiber diameters of here disclosed intermediate layer 6 are in the approximate range of one to thirteen micrometers (1–13 um) with an average fiber diameter of approximately six micrometers (6 um). The second intermediate layer 6 further has an approximate air permeability of nine hundred cubic feet per minute per square foot (900 CFM/sq.ft.).

The facing third fibrous layer 7 of melt blown polymeric fibers also has an approximate thickness of zero point zero zero six inches (0.006")—like intermediate layer 6 so as to make the overall facing three layers 4,6 and 7 zero point one three seven inches (0.137") thick. The approximate basis weight of the third layer 7 is zero point two four ounces per square yard (0.24 oz./yd$^2$)—so as to make the approximate overall weight of layers 4,6 and 7 three point zero six ounces per square yard (3.06 oz./yd.$^2$)—with fiber diameters of layer 7 being in the approximate range of one to ten micrometers (1–10 um), an approximate average fiber diameter of layer 7 being five micrometers (5 um) in diameter. Further, the third fibrous layer 7 has an approximate air permeability of seven hundred cubic feet per minute per square foot (700 CFM/sq.ft.). Advantageously, the second polymeric fibrous layer 6 has more ropings (clustered strands of fibers) than the third polymeric fibrous layer 7 and each of the three facing fibrous layers 4, 6 and 7 have a substantially equal terminal pressure drop of approximately zero point three three inches water gauge (0.33") so as to result in a total terminal pressure drop across the layered media 2 of approximately one inch water gauge (1.0").

As can be seen in the graph of FIG. 3 of the drawings which plots dust spot efficiency (%) on the vertical axis against differential pressure (inches of water) on the horizontal axis, the inventive three layers (4,6 and 7) of filter media has a much higher efficiency when compared to the efficiency of only the first layer 4. In fact, the inventive filter media described herein has an average dust spot efficiency better than forty percent (40%) by ASHRAE 52.1—1992 Standard Test Method tested to a final pressure drop of one inch (1") water gauge.

The invention claimed is:

1. A composite filter arrangement of fibrous layers of filter media for removing particulate matter from a fluid stream comprising:
   an upstream first layer having upstream and downstream faces of a mixture of preselected fiber filter media components, said first upstream layer being of preselected thickness with said fiber components being of preselected fiber diameter to provide a first preselected fluid permeability and;
   at least a second successive intermediate layer of polymeric fibers of filter media of preselected thickness and fiber diameter to provide a second preselected fluid permeability, each of said layers having a substantially equal terminal pressure drop thereacross.

2. The composite filter arrangement of claim 1, said upstream first layer of a mixture of preselected fiber filter media being a mixture of cotton and polyester fiber filter media.

3. The composite filter arrangement of claim 2, wherein said first layer is air laid and said second layer is melt blown polymeric fibers, with said layers of filter media being in facing relationship with an approximate overall thickness of zero point one three seven inches (0.137").

4. The composite filter arrangement of claim 3, wherein said second layer of melt blown polymeric fibers range in diameter from approximately one to thirteen micrometers (1–13 um) with an average of fiber diameters being around six micrometers (6 um).

5. The composite filter arrangement of claim 2, wherein said first layer of cotton fibers range in diameter from approximately ten to twenty-eight micrometers (10–28 um) and said polyester fibers in said first layer range in diameter from approximately five to sixteen micrometers (5–16 um).

6. The composite filter arrangement of claim 2, and a third successive downstream layer of melt blown polymeric fibers of filter media of preselected thickness and fiber diameter less than the fiber diameter of said second successive layer to provide a third preselected fluid permeability.

7. The composite filter arrangement of claim 6 where said first layer of filter media is of approximately zero point one two five inches (0.125") in thickness and said second and third layers are each approximately zero point zero zero six inches (0.006") in thickness with an overall thickness of zero point one three seven inches (0.137").

8. The composite filter arrangement of claim 6, wherein said first, second and third layers of filter media are in facing relationship with an approximate overall basis weight of three point zero six ounces per square yard (3.06 oz/yd$^2$).

9. The composite filter arrangement of claim 8, wherein said first layer of filter media is approximately two point five ounces per square yard (2.5 oz/yd$^2$) in basis weight, said second layer of filter media is approximately zero point three two ounces per square yard (0.32 oz/yd$^2$) in basis weight, and said third layer of filter media is approximately zero point two four ounces per square yard (0.24 oz/yd$^2$) in basis weight.

10. The composite filter arrangement of claim 6, wherein said third layer of melt blown polymeric fibers range in approximate diameter from one to ten micrometers (1–10 um) with average fiber diameter being approximately five micrometers (5 um).

11. The composite filter arrangement of claim 6, wherein said second layer of polymeric fibers has more ropings (strand clusters) than said third layer of polymeric fibers.

12. The composite filter arrangement of claim 6, wherein said first layer of filter media has an air permeability of around five hundred cubic feet per minute per square foot (500 CFM/sq.ft.), said second layer of filter media has an air permeability of nine hundred cubic feet per minute per square foot (900 CFM/sq.ft.) and said third layer of filter media has an air permeability of seven hundred cubic feet per minute per square foot (700 CFM/sq.ft.) with the combination of said first, said second and said third layers of filter media having an overall air permeability of three hundred cubic feet per minute per square foot (300 CFM/sq. ft.).

13. The composite filter arrangement of claim 6, wherein said first layer of said mixture of cotton and polyester fiber media include cotton fibers which range in diameter from approximately ten to twenty micrometers (10–28 um) and include polyester fibers which range in diameter from approximately five to sixteen micrometers (5–16 um); said second layer of polymeric fibers include fibers which range in diameter from approximately one to thirteen micrometers (1–13 um); and said third layer of melt blown polymeric fibers include fibers which range in diameter from approximately one to ten micrometers (1–10 um).

14. The composite filter arrangement of claim 13, the approximate average fiber diameter of all fibers in said first layer of said mixture of cotton and polyester fiber media being approximately six micrometers (6 um) and the approximate average fiber diameter of said third layer of melt blown polymeric fibers being approximately five micrometers (5 um).

15. The composite filter arrangement of claim 1, said first layer of filter media including sprayed preselected binder on said upstream and downstream faces of substantially equal amounts by weight in ounces per square yard.

16. The composite filter arrangement of claim 15 said binder being a binder fiber.

17. The composite filter arrangement of claim 15, said binder being ethylene vinyl chloride.

18. The composite filter arrangement of claim 15, said binder being poly vinyl acetate.

19. A composite filter arrangement of fibrous layers of filter media for removing particulate matter from a fluid stream comprising:

an upstream first layer of an air laid mixture of cotton and polyester fiber filter media with said cotton fibers having diameters in the approximate range of ten to twenty eight micrometers (10–28 um) and said polyester fibers having diameters in the approximate range of five to sixteen micrometers (5–16 um), said first upstream layer having an approximate thickness of zero point one two five inches (0.125"), a basis approximate weight of two point five ounces per square yard (2.5 oz/sq.yd.), and an approximate air permeability of five hundred cubic feet per minute per square foot (500 CFM/sq.ft.) with a binder of ethylene vinyl chloride applied to opposite faces thereof; a facing second layer of melt blown polymeric fibers having an approximate thickness of zero point zero zero six inches (0.006"), an approximate basis weight of zero point three two ounces per square yard (0.32 oz/yd$^2$) with fiber diameters in the approximate range of one to thirteen micrometers (1–13 um) with an average fiber being of approximately six micrometers (6 um) in diameter and with the second layer having an approximate air permeability of nine hundred cubic feet per minute per square foot (900 CFM/sq.ft.); and, a facing third layer of melt blown polymeric fibers also having an approximate thickness of zero point zero zero six inches (0.006"), with an approximate basis weight of zero point two four ounces per square yard (0.24 oz/yd$^2$) with fiber diameters in the approximate range of one to ten micrometers (1–10 um) with an average of the fibers being of approximately five micrometers (5 um) diameter and with the third layer having approximate air permeability of seven hundred cubic feet per minute per square foot (700 CFM/sq.ft.); the second layer of filter media having more ropings (Strand clusters) than said third layer and with said first, second and third layers having substantially equal terminal pressure drops thereacross.

* * * * *